(12) United States Patent
Shiraishi

(10) Patent No.: US 7,434,456 B2
(45) Date of Patent: Oct. 14, 2008

(54) METHOD FOR PNEUMATIC TIRE SIMULATION

(75) Inventor: Masaki Shiraishi, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 11/635,605

(22) Filed: Dec. 8, 2006

(65) Prior Publication Data

US 2007/0137290 A1 Jun. 21, 2007

(30) Foreign Application Priority Data

Dec. 13, 2005 (JP) .............................. 2005-359330

(51) Int. Cl.
*G01M 17/02* (2006.01)
(52) U.S. Cl. ........................................ 73/146; 702/140
(58) Field of Classification Search .................. 73/147, 73/146; 702/140
See application file for complete search history.

(56) References Cited

U.S. PATENT DOCUMENTS

| 5,610,330 | A | * | 3/1997 | Fricke et al. | 73/146 |
|---|---|---|---|---|---|
| 5,750,890 | A | * | 5/1998 | Fricke et al. | 73/146 |
| 5,900,542 | A | * | 5/1999 | Fricke et al. | 73/146 |
| 6,134,957 | A | * | 10/2000 | Fricke et al. | 73/146 |
| 2001/0020386 | A1 | * | 9/2001 | Mancosu et al. | 73/146 |
| 2002/0014114 | A1 | * | 2/2002 | Mancosu et al. | 73/146 |
| 2003/0211446 | A1 | * | 11/2003 | Harashima et al. | 434/61 |
| 2004/0050150 | A1 | * | 3/2004 | Jahn et al. | 73/146 |
| 2004/0083802 | A1 | * | 5/2004 | Wieser | 73/146 |
| 2005/0120783 | A1 | * | 6/2005 | Namoun | 73/117 |
| 2005/0145026 | A1 | * | 7/2005 | Jahn et al. | 73/146 |
| 2005/0268708 | A1 | * | 12/2005 | Satou et al. | 73/146 |

FOREIGN PATENT DOCUMENTS

| DE | 100 51 735 A1 | 5/2002 |
|---|---|---|
| EP | 1 380 972 A2 | 1/2004 |
| JP | 2004-020229 A | 1/2004 |

OTHER PUBLICATIONS

R. Gunda et al., Analytical Model of Tire Cavity Resonance and Coupled Tire/Cavity Modal Model., Tire Science and Technology, TSTCA, vol. 28, No. 1, pp. 33-49, Jan.-Mar. 2000.

(Continued)

*Primary Examiner*—Andre J Allen
(74) *Attorney, Agent, or Firm*—Birch, Stewart, Kolasch & Birch, LLP

(57) ABSTRACT

A method for pneumatic tire simulation comprises the steps of modeling a tire body having a cavity extending in a circumferential direction of the tire using finite elements to build a tire body model, modeling the cavity surrounded by the tire body using finite volumes to build a cavity model, setting a pneumatic tire model coupled the tire body model with the cavity model so that a relative distance between an outer surface of the cavity model and an inner surface of the tire body model does not change, modeling a road using finite elements to build a road model, and executing a numerical simulation in which the tire model is made to roll on the road model in a predetermined condition.

9 Claims, 17 Drawing Sheets

OTHER PUBLICATIONS

Clayton W B et al; International Modal Analysis Conference, vol. 1, No. 16th, 1998, pp. 50-56, XP009078210.

Gunda R et al; Tire Sci Technol; Tire Science and Technology 2000 Tire Soc Inc, vol. 28, No. 1, 2000, pp. 33-49, XP009078003.

L.R. Molisani et al; Int. J. Solids Struct.; International Journal of Solids and Structures Sep. 2003, vol. 40, No. 19, Sep. 2003, pp. 5125-5138, XP002418315.

Yamauchi Hiroshi et al; JSAE Rev; JSAE Review Jan. 2002, vol. 23, No. 1, Jan. 2002, pp. 89-94, XP002418316.

* cited by examiner (Example 1)

METHOD FOR PNEUMATIC TIRE SIMULATION

BACKGROUND OF THE INVENTION

1. Field of the Invention

The present invention relates to a method for pneumatic tire simulation capable of predicting a vibration of a pneumatic tire in consideration of a physical phenomenon of fluid filled in the cavity of the pneumatic tire.

2. Background Art

Conventionally, computer simulation using a numerical analysis method, such as the finite element method, has been suggested. This approach enables the prediction of tire performance without manufacturing prototype tires. In order to predict vibration performance of a tire, for example, rolling simulation which makes a tire model rotate on a road model, and obtains a history of vertical force acting on the tire axis is proposed.

Conventional simulation, however, does not consider influence of fluid filled in a cavity of the tire. Namely, it is well known that a cavity resonance of the fluid is generated in the cavity during the tire is running. Accordingly in order to simulate the vibration performance of the tire accurately, it is necessary to consider influence of a physical phenomenon of the fluid filled in the cavity.

SUMMARY OF THE INVENTION

It is a main object of the present invention to provide a method for pneumatic tire simulation which considers influence of the physical phenomenon of the fluid filled in the cavity, and can accurately simulate the vibration performance of the tire.

According to the present invention, a method for pneumatic tire simulation comprises the steps of modeling a tire body having a cavity extending in a circumferential direction of the tire using finite elements to build a tire body model, modeling the cavity surrounded by the tire body using finite volumes to build a cavity model, setting a pneumatic tire model coupled the tire body model with the cavity model so that a relative distance between an outer surface of the cavity model and an inner surface of the tire body model does not change, modeling a road using finite elements to build a road model, and executing a numerical simulation in which the tire model is made to roll on the road model in a predetermined condition.

DESCRIPTION OF THE PREFERRED EMBODIMENTS

An embodiment of the present invention will be described as follows based on the drawings.

Figure 1:
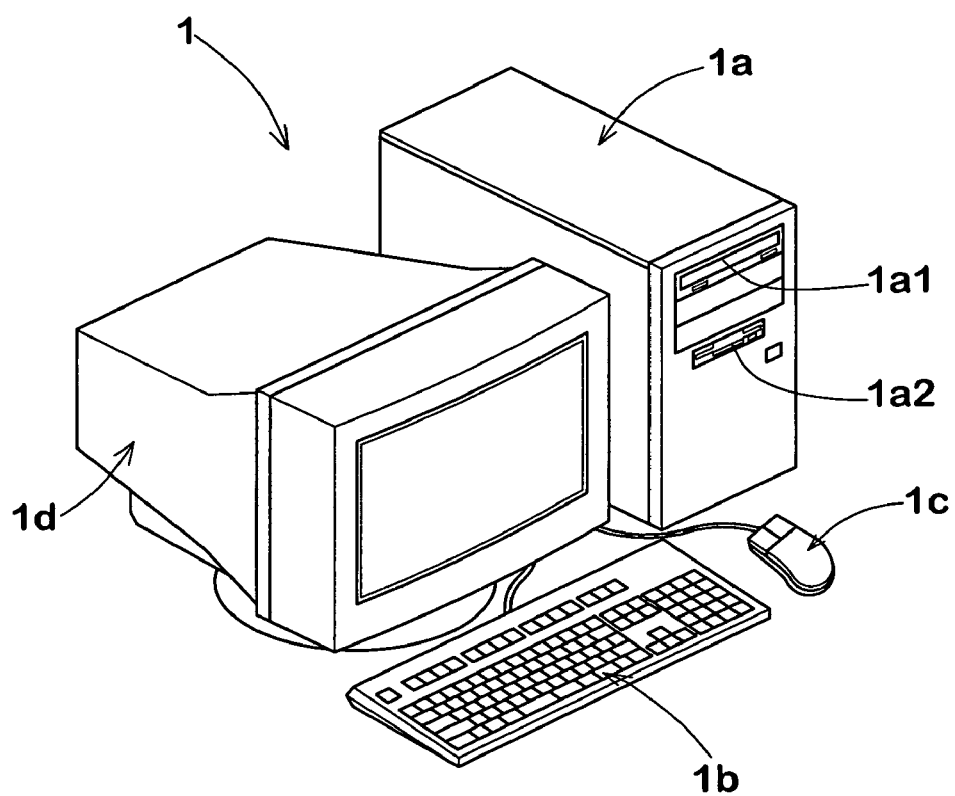
FIG. 1 is an illustration of a computer device for executing the simulation method.

FIG. 1 shows a computer device 1 used for the simulation method of the present invention. The computer device 1 comprises a main body 1a, a key board 1b, a mouse 1c, and a display device 1d. The main body 1a includes disk drives 1a1 and 1a2, a CPU, a ROM, a memory, and a bulk storage (which are not illustrated). The bulk storage stores programs which execute the simulation method described below.

Figure 2:
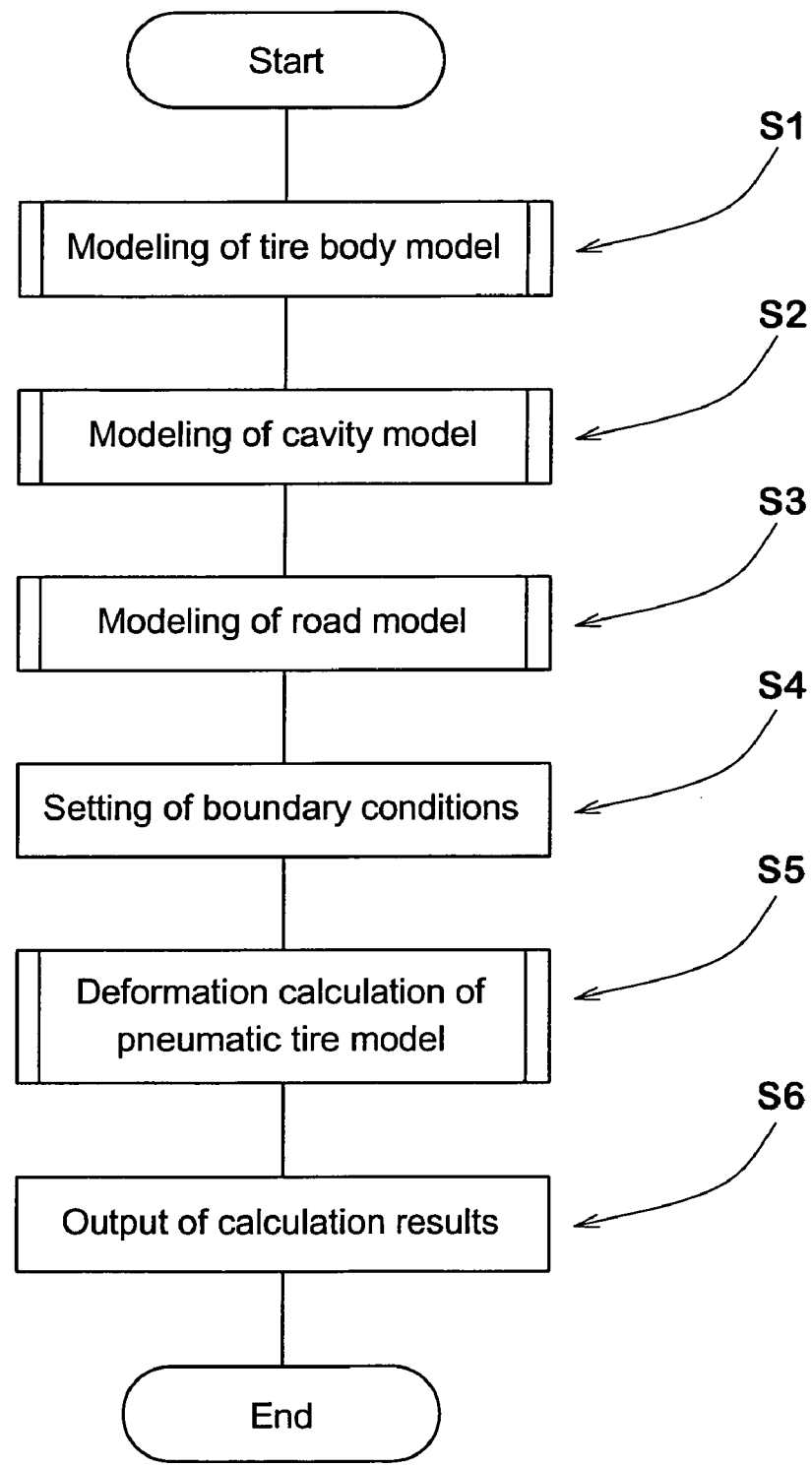
FIG. 2 is a flowchart showing an embodiment of the simulation method.

FIG. 2 shows one embodiment of the procedure of the invention simulation method. In the Step S1, a tire body model is set by modeling a tire body using finite elements capable of numerical analysis.

Figure 3:
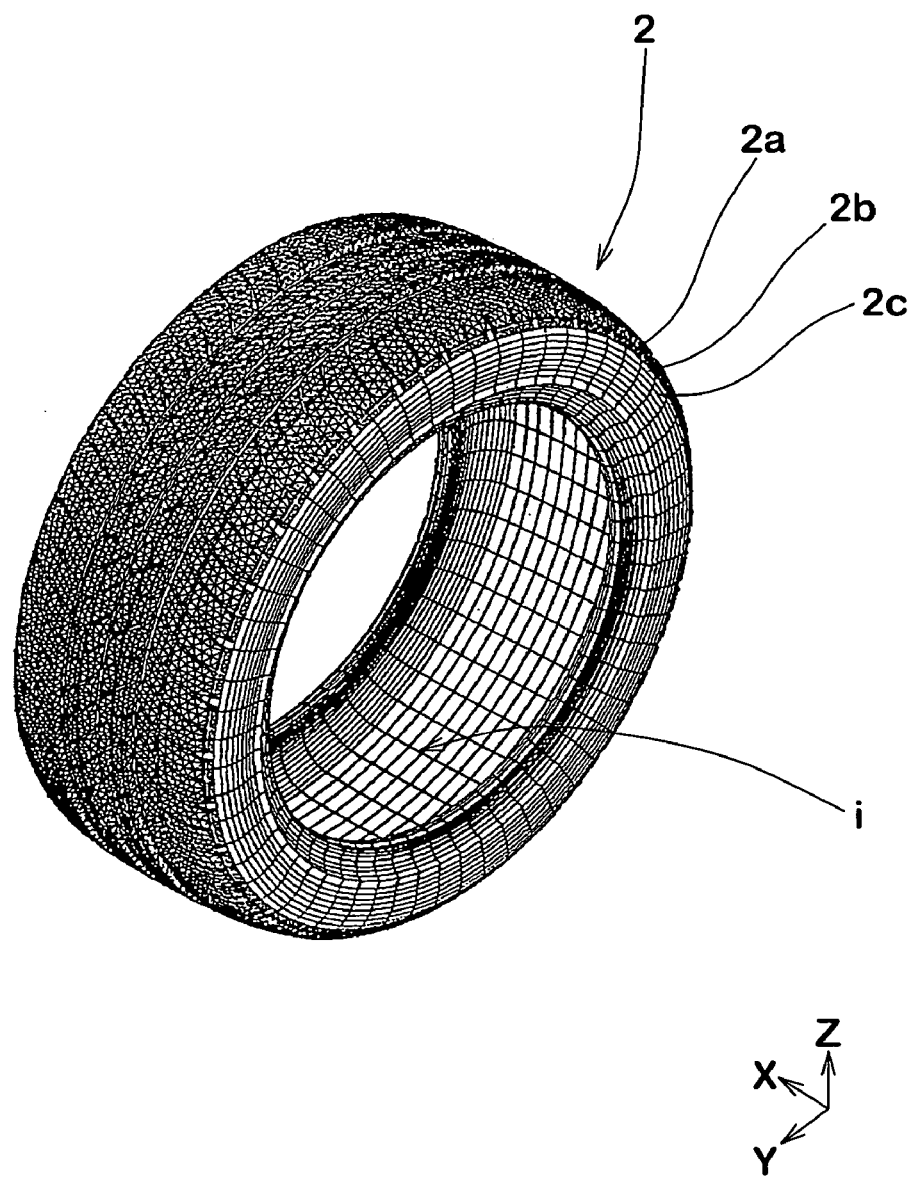
FIG. 3 is a perspective view showing an embodiment of a tire body model.
Figure 4:
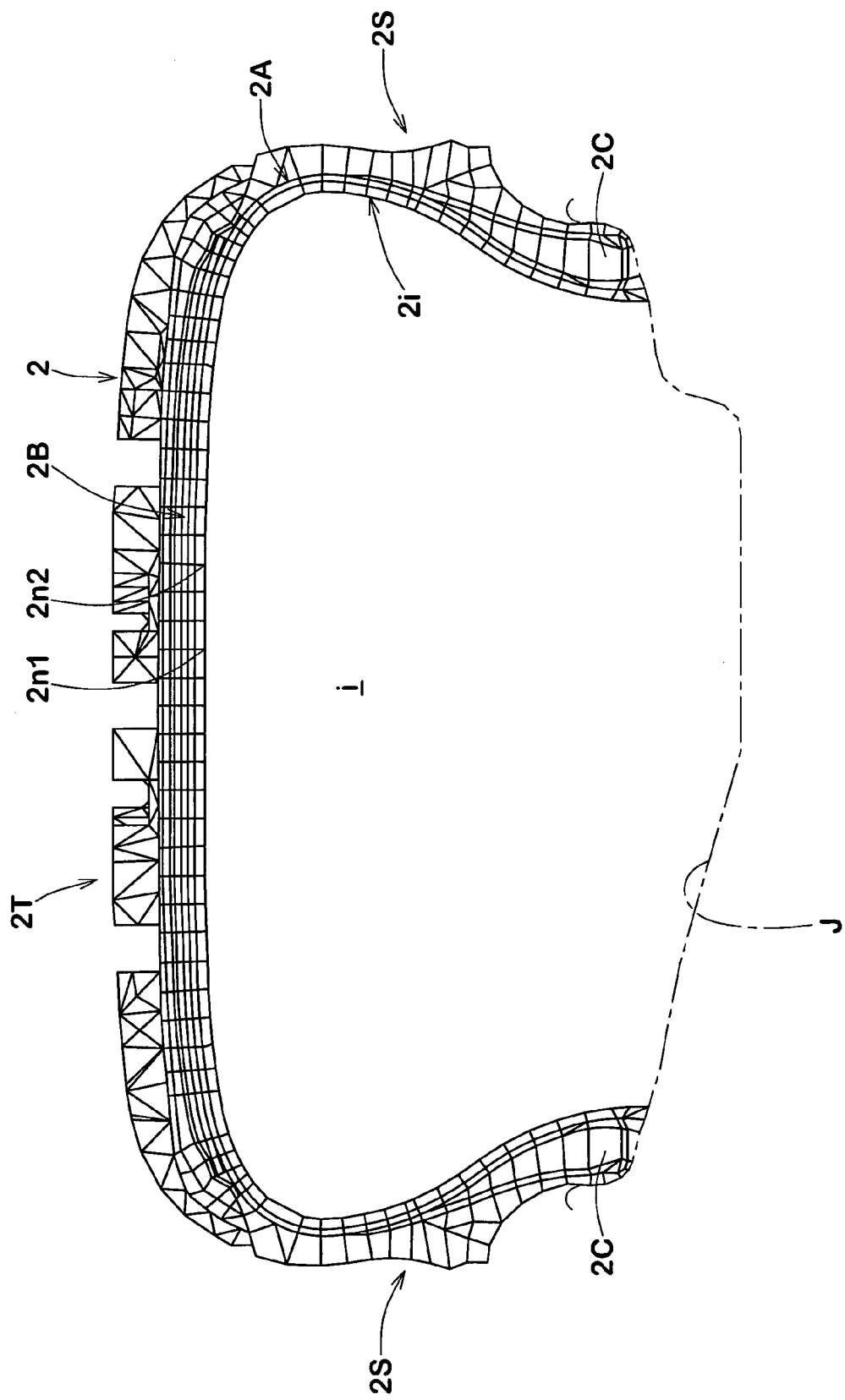
FIG. 4 is a cross sectional view of FIG. 3.

FIG. 3 is one embodiment of the tire body model 2 which is visualized in three-dimensional, and FIG. 4 is a cross sectional view thereof including the tire axis. In the tire body model 2, the tire body to be analyzed is divided into a finite number of small elements $2a, 2b, 2c \ldots$. Each of the elements $2a, 2b, 2c \ldots$ can be, but not limited to, rectangular plane elements or three-dimensional tetrahedral solid elements. Other various elements such as pentagonal and/or hexagonal solid elements are also employed.

Each elements $2a, 2b, 2c \ldots$ is a numerical data capable of deformation calculation by the computer device 1. Further, the tire model 2 includes the coordinate values of nodes on each element $2a, 2b, 2c \ldots$, their shapes, and their properties such as density, modulus and/or damping coefficient. The numerical analysis includes, for example, the finite element method, the finite volume method, the finite difference method and the boundary element method. In this embodiment, as for each element $2a, 2b, 2c \ldots$, the Lagrange element which can move with the tire body model in a simulating space is employed.

The tire body model 2 has a toroidal shape which comprises: a pair of sidewall portions 2S; a tread portion 2T interposed therebetween; and a cavity i surrounded by the tread portion 2T and sidewall portions 2S and being continuously extending in the circumferential direction of the tire. The cavity i is a space where fluid such as air or other gas is filled. Further, the cavity i is defined as a closed and toroidal space surrounded by the inner surface $2i$ of the tire body model 2 and an outer surface J of the rim on which the tire body model 2 is mounted. The outer surface J of the rim is given according to the size of the tire body model 2 and various tire standards.

In order to improve the accuracy of the simulation, it is preferable that the tire body model 2 comprises a tread pattern including longitudinal grooves and transverse grooves on the tread portion 2T, but these grooves may be omitted. In the same manner, reinforcing members inside such as a carcass 2A, a belt 2B and a pair of bead core 2C, are also preferably modeled into the tire body model 2. In this embodiment, the tire body model 2 is divided into 80 elements with respect to the circumferential direction of the tire.

Figure 5:
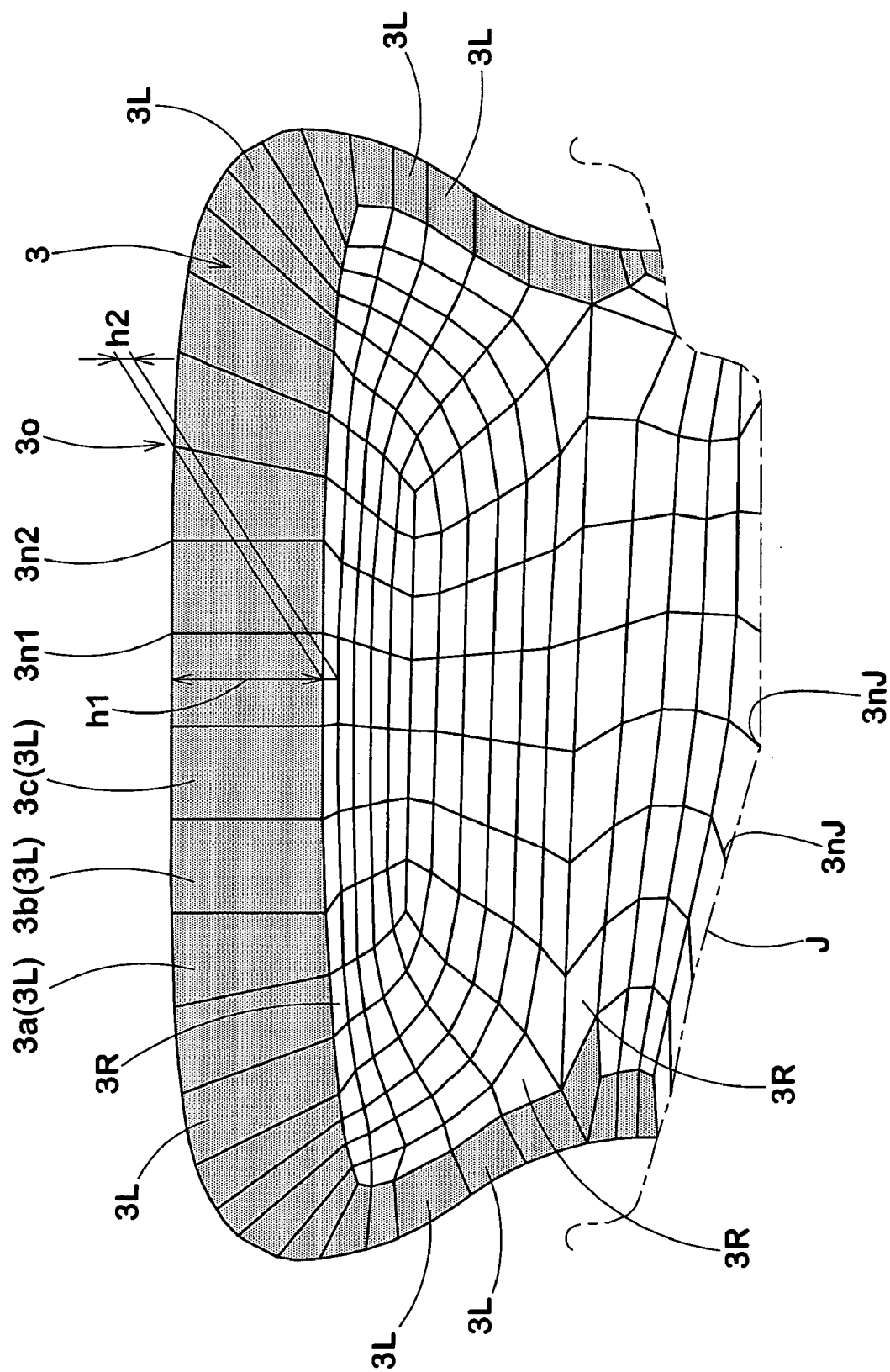
FIG. 5 is a cross sectional view showing an embodiment of a cavity model.

Next, in the step S2, a cavity model 3 is set by modeling the cavity i in finite volumes capable of the numerical analysis. FIG. 5 shows a cross sectional view of one embodiment of the cavity model 3 which is visualized at the same section of FIG. 4. In the cavity model 3, the cavity i to be analyzed is divided into finite volumes (Euler finite volumes) 3a, 3b, 3c which are numerical data capable of deformation calculation such as pressure calculation by the computer device 1.

Further, the cavity model 3 includes coordinate values of nodes on each volume 3a, 3b, 3c . . . , their shapes, and their properties such as density and bulk modulus. In this embodiment, each finite volume is numerical fluid corresponding to a simulating fluid such as air, nitrogen, helium or mixture gas thereof to be filled in the cavity i of the tire body model 2.

In this embodiment, the cavity model 3 is also divided into 80 elements with respect to the circumferential direction of the tire.

Figure 6:
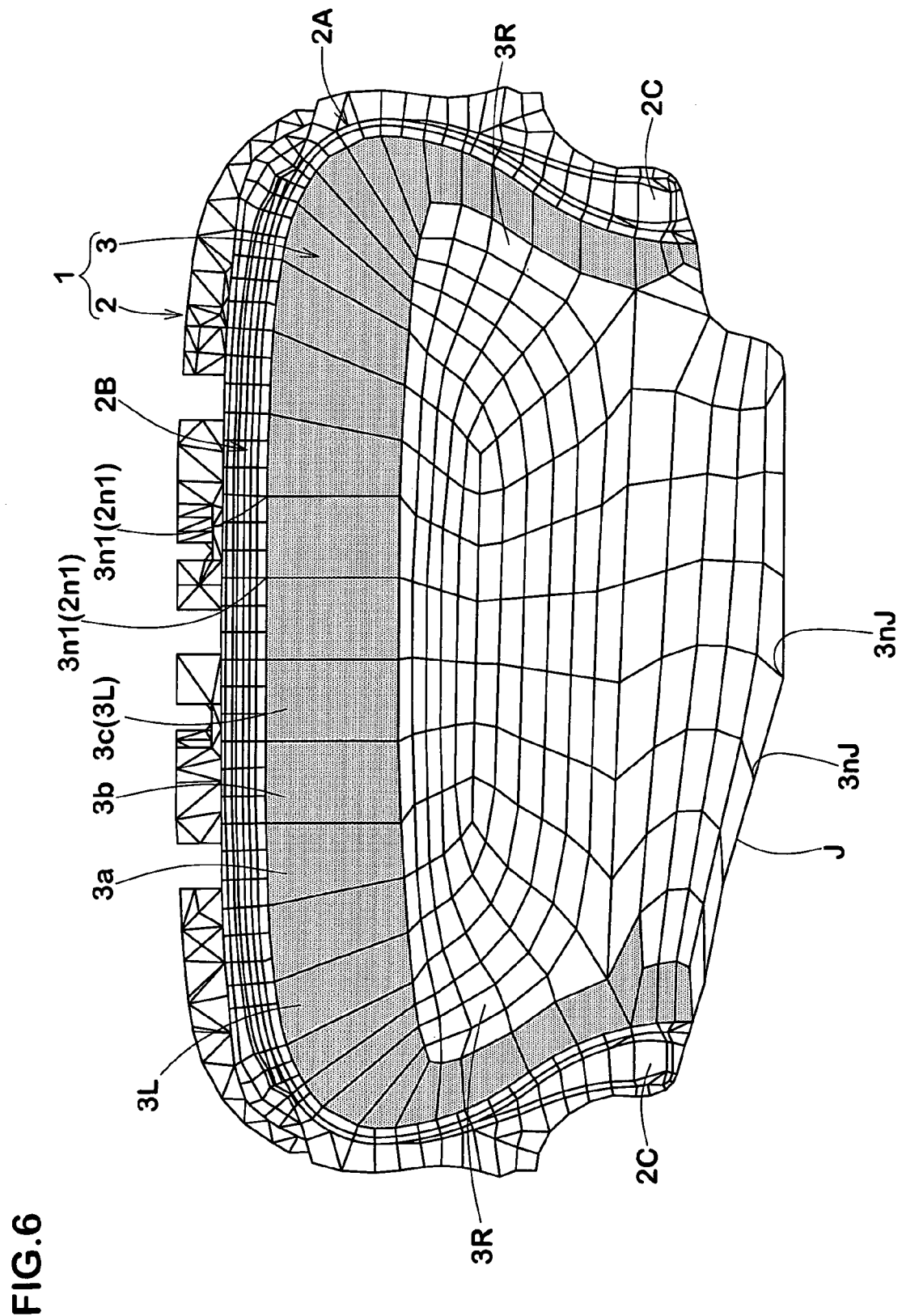
FIG. 6 is a cross sectional view showing an embodiment of a pneumatic tire model.

Further, in this embodiment, the cavity model 3 has the outer surface 3i corresponding to the inner surface 2i of the tire body model 2. Accordingly, as shown in FIG. 6, the cavity model 3 can perfectly fill in the cavity i of the tire model 2 by arranging each center axis of the tire body model 2 and the cavity model 3 on the same position. Thereby, a pneumatic tire model 1 which comprises the tire body model 2 and the cavity model 3 is built.

In the pneumatic tire model 1, all of outer nodes 3n1, 3n2 . . . which face to the inner surface 2i of the tire model 2 are provided on the same position corresponding to inner nodes 2n1, 2n2 . . . on the inner surface of the tire body model 2. Namely, outer nodes 3n1, 3n2 . . . of the cavity model 3 are shared with inner nodes 2n1, 2n2 . . . of the tire body model 2. However, it is not especially limited to such an embodiment. For example, outer nodes 3n1, 3n2 . . . of the cavity model 3 may be provided on different position from inner nodes 2n1, 2n2 . . . of the tire body model 2.

Further, finite volumes of the cavity model 3 comprise a plurality of covering volumes 3L each being coupled to the inner surface 2i of the tire body model 2, and a plurality of mid volumes 3R being surrounded by the covering volumes 3L.

Here, the tire model 2 may roll and deform during a rolling simulation with tire load. In this embodiment, only covering volumes 3L being directly coupled with the inner surface 2i of the tire body model 2 are given deformable property. Namely, each covering volumes 3L is defined as the Lagrange element which can move and deform together with the tire body model 2. On the other hand, all of the elements of the cavity model 3 except the covering volumes 3L are defined as the Euler elements which can only rotate, but not deform. As shown in FIG. 5, covering volume 3L of the cavity model 3 has a greater volume than that of mid volume 3R being coupled with inside thereof so that negative deformation of the covering volume 3L does not generate even when the tread portion 2T of the tire body model 2 greatly deforms.

Especially, covering volumes 3L being coupled with the inner surface 2i of the tread portion 2T and sidewall portions 2S preferably have a greater volume than that of the mid volume 3R being coupled inside thereof, because a large deformation tends to easily occur in the tread portion 2T and sidewall portions 2S of the tire body model 2. In this point of view, the covering volume 3L being coupled with the inner surface 2i of the tread portion 2T preferably has a radial length h1 greater than the radial length h2 of the mid volume 3R being coupled inside thereof, as shown in FIG. 5.

In another embodiment, all of the volumes of the cavity model 3 may be defined as the Euler elements being basically fixed in the space for simulation. Namely, cavity model 3 is built as an Euler model. In the Euler model, movement of fluid among meshes is taken into consideration with the simulation, and the cavity i of the tire body model 2 is always filled by the numerical fluid of the cavity model 3. Further, pressure acting into each volume is calculated at each constant position.

In further another embodiment, the cavity model 3 may be re-modeled according to the deformation of the pneumatic tire model 1. In this case, it is preferable that a finite volume in which a great pressure change occurs is re-modeled into as a smaller volume, and a finite volume in which a small pressure change occurs is re-modeled into as a greater volume.

Further, the coupling condition for coupling between the tire body model 2 and the cavity model 3 so that a relative distance between the outer surface 3o of the cavity model 3 and the inner surface 2i of the tire body model 2 does not change is defined in the pneumatic tire model 1. Namely, inner planes and nodes (2n1, 2n2, . . . ) of finite volumes on the inner surface 2i of the tire body model 2 are coupled with outer planes and nodes (3n1, 3n2, . . . ) of finite volumes on the outer surface 3o of the cavity model 3 so that the relative position between inner surface 2i of the tire model 2 and the outer surface 3o of the cavity model 3 does not change.

Figure 7A:
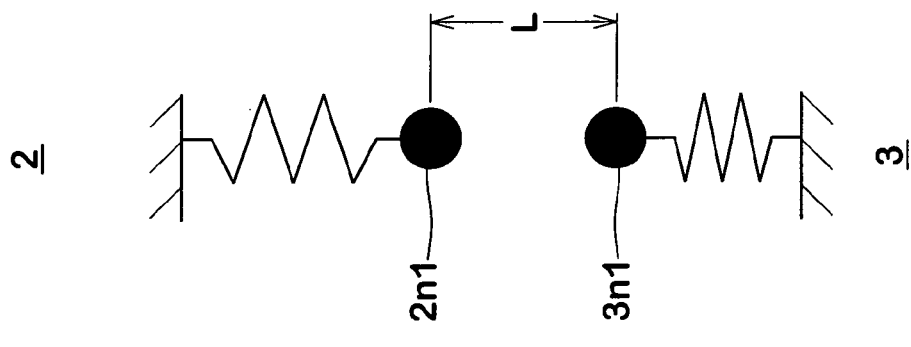
FIGS. 7(A) to 7(C) are schematic diagrams explaining a coupling condition between the tire body model and the cavity model.
Figure 7B:
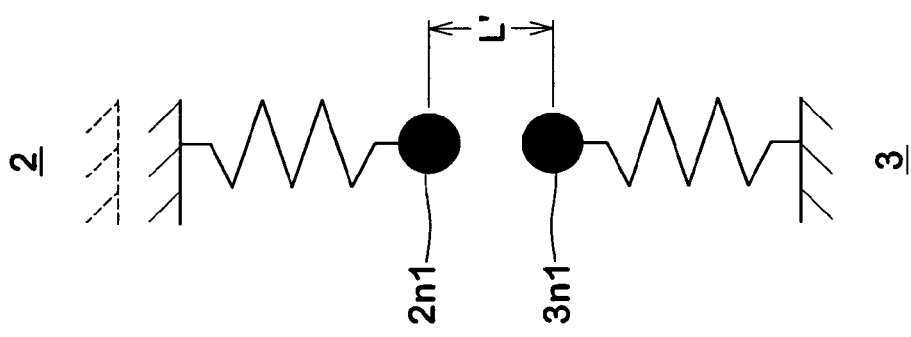

For example, FIG. 7(A) shows a coupling boundary between the inner nodes 2n1 of the tire model 2 and the outer nodes 3n1 of the cavity model 3 which has an initial distance L (In the present embodiment shown in FIG. 6, however, the distance L is set to zero). Here, if the inner node 2n1 is displaced toward inside according to the deformation of the tire model 2, the distance L becomes shorter as L' as shown in FIG. 7(B). However, according to the boundary condition above, the positions of nodes 2n1 and 3n1 are adjusted so that the distance L' between the inner node 2n1 and the outer nodes 3n1 is kept the initial length L.

Figure 7C:
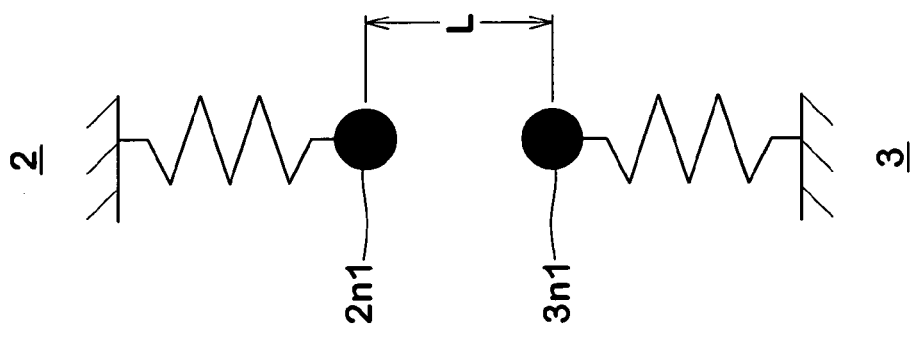

The positions of nodes 2n1 and 3n1 are determined according to the deformation balance between the tire model 2 and the cavity model 3 based on their elastic moduli, etc. For example, since the elastic modulus of the finite element of the tire model 2 is usually greater than the bulk modulus of the finite volume of the cavity model 3, the inner node 2n1 of the tire model 2 hardly moves as shown in FIG. 7(C). On the other hand, the outer nodes 3n1 of the cavity model 3 would mainly be moved so that the relative distance is kept as the initial distance L. Accordingly, force acting on the tire body model 2 is inputted into the cavity model 3 through the boundary between the tire body model 2 and the cavity model 3. Namely, the interaction between the tire body model 2 and the cavity model 3 is simulated.

In the same manner, inner nodes 3nJ of the cavity model 3 facing to the outline J of the rim are also coupled with the outline J so that the relative distance is not changed. In this embodiment, the inner nodes 3nJ of the cavity model 3 can not move because the outline J of the rim is defined as a rigid body.

Figure 8:
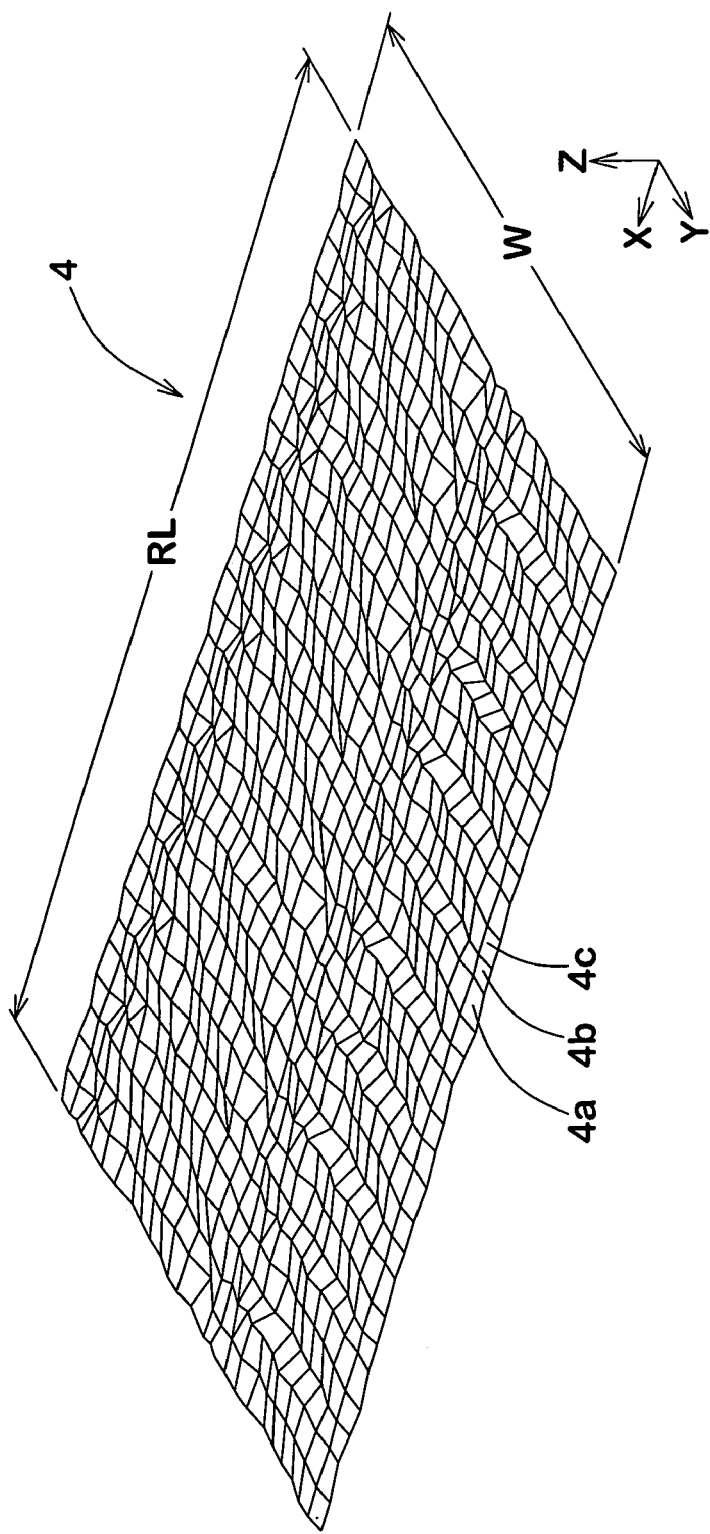
FIG. 8 is a perspective view showing an embodiment of a road model.

Next, in the step S3, a road model 4 is set using finite elements 4a, 4b, 4c . . . which are rigid elements. FIG. 8 shows one embodiment of the road model 4 which is visualized in three-dimensional. The road model 4 has a width w and a longitudinal length RL as necessary for the rotation of the pneumatic tire model 1.

In one embodiment, the road model 4 may be built so as to have a smooth surface. In the present embodiment, the road model 4 has a rough surface simulated as rough asphalt road so that the vibration property of the pneumatic tire model 1 is emphasized. According to a real asphalt road, a vertical gap between the lowest and the highest surfaces of the road model 4 is preferably set from 3 to 15 mm, and more preferably 6 to 12 mm. Further, in the present embodiment, a pitch between the nodes of the elements on the road model 4 is 20 mm.

Next, in step S4, boundary conditions for the simulation are set. The boundary conditions, for example, include necessary condition for executing the rolling simulation which makes the pneumatic tire model 1 rotate on the road model 4 such as internal pressure of the pneumatic tire model 1, friction coefficient between the tire model 2 and the road model 4, the tire load, the slip angle, the camber angle and rotating speed.

Further, initial density and bulk modulus are defined into each finite volume of the cavity model 3, according to fluid which is simulated filled in the cavity i. In this present embodiment, the initial density and the bulk modulus are defined as follows under the temperature of 25 degrees C. and the inner pressure of 200 kPa.

Density: 3.52 kg/m$^3$
Bulk modulus: 423 KPa.

Further, the internal pressure is expressed by executing a static inflating-simulation of applying an uniformly distributed load having the same value as the internal pressure for simulation on the inner surface 2*i* of the tire body model 2. Accordingly, in the present embodiment, the cavity model 3 is not used as a medium for applying the internal pressure on the tire body model 2. Therefore, the initial cross section of the cavity model 3 is built according to the inner surface 2*i* of the tire body model 2 after the mentioned-above inflating-simulation. If the cavity model 3 is used as the medium above, a large scale simulation which comprises the steps of preparing a great number of finite volumes of the cavity model 3 firstly, and injecting them continuously into the tire body model 2 has to be executed. This is not preferable because a lot of time is required for the calculation.

Accordingly, in the present embodiment, each finite volume of the cavity model 3 has zero pressure even when the inner pressure has been applied on the tire body model 2. However, when the deformation of the tire body model 2 occurs by contacting and rotating on the road model 4, the deformation is given to each volume of the cavity model 3 as force according to the coupling condition between the tire body model 2 and the cavity model 3. Thereby, the pressure changes in the cavity i of the tire body model 2 can be expressed using the relative pressure based on the initial pressure of each finite volume of the cavity model 3. In the present invention, other conditions for executing the numerical simulation are as follows.

Running speed of pneumatic tire model: 80 km/H
Internal pressure: 200 kPa
Slip angle: 0 degree
Camber angle: 0 degree
Static friction coefficient: 1.0
Dynamic friction coefficient: 1.0

Figure 9:
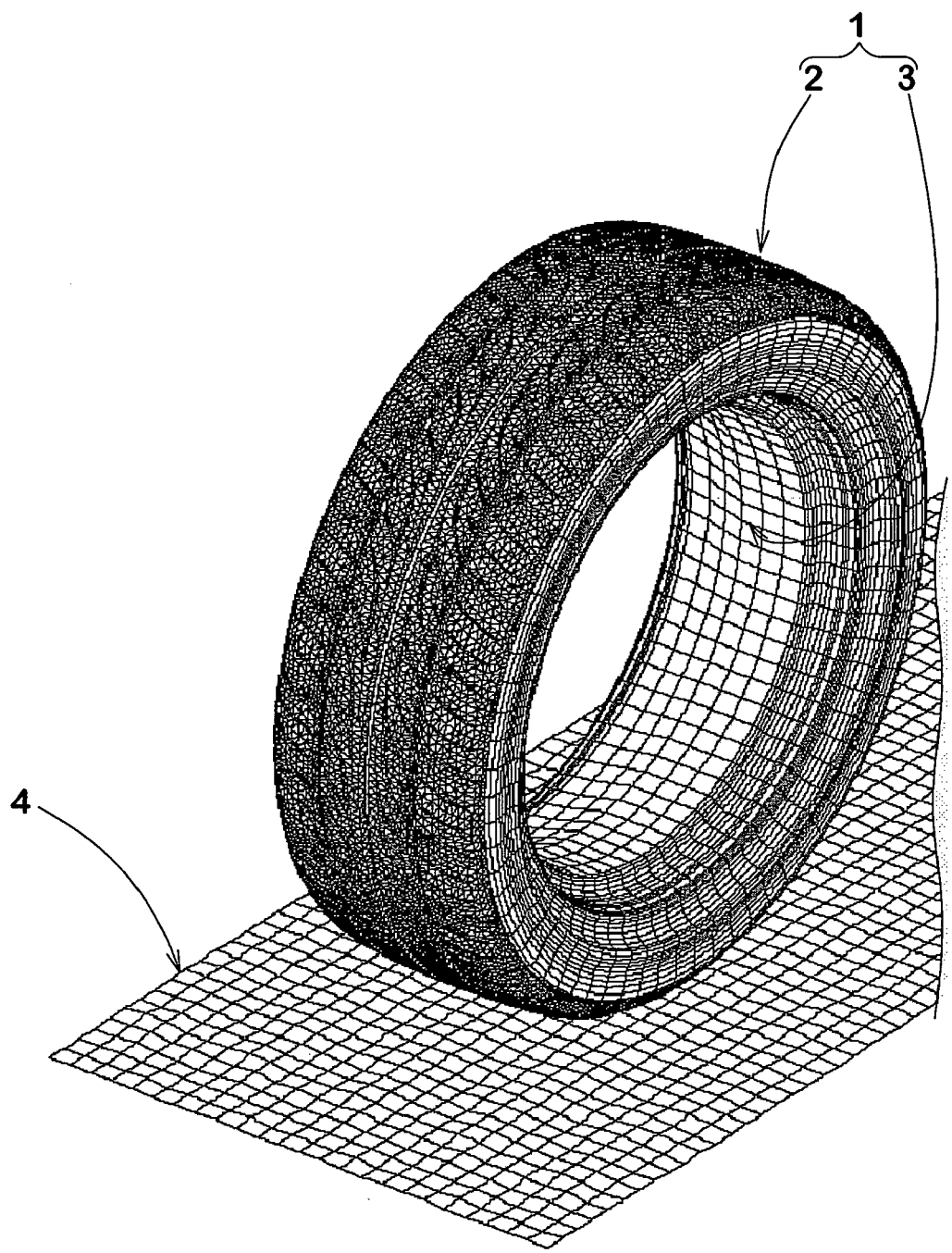
FIG. 9 is a perspective view showing an embodiment of rolling simulation.
Figure 10:
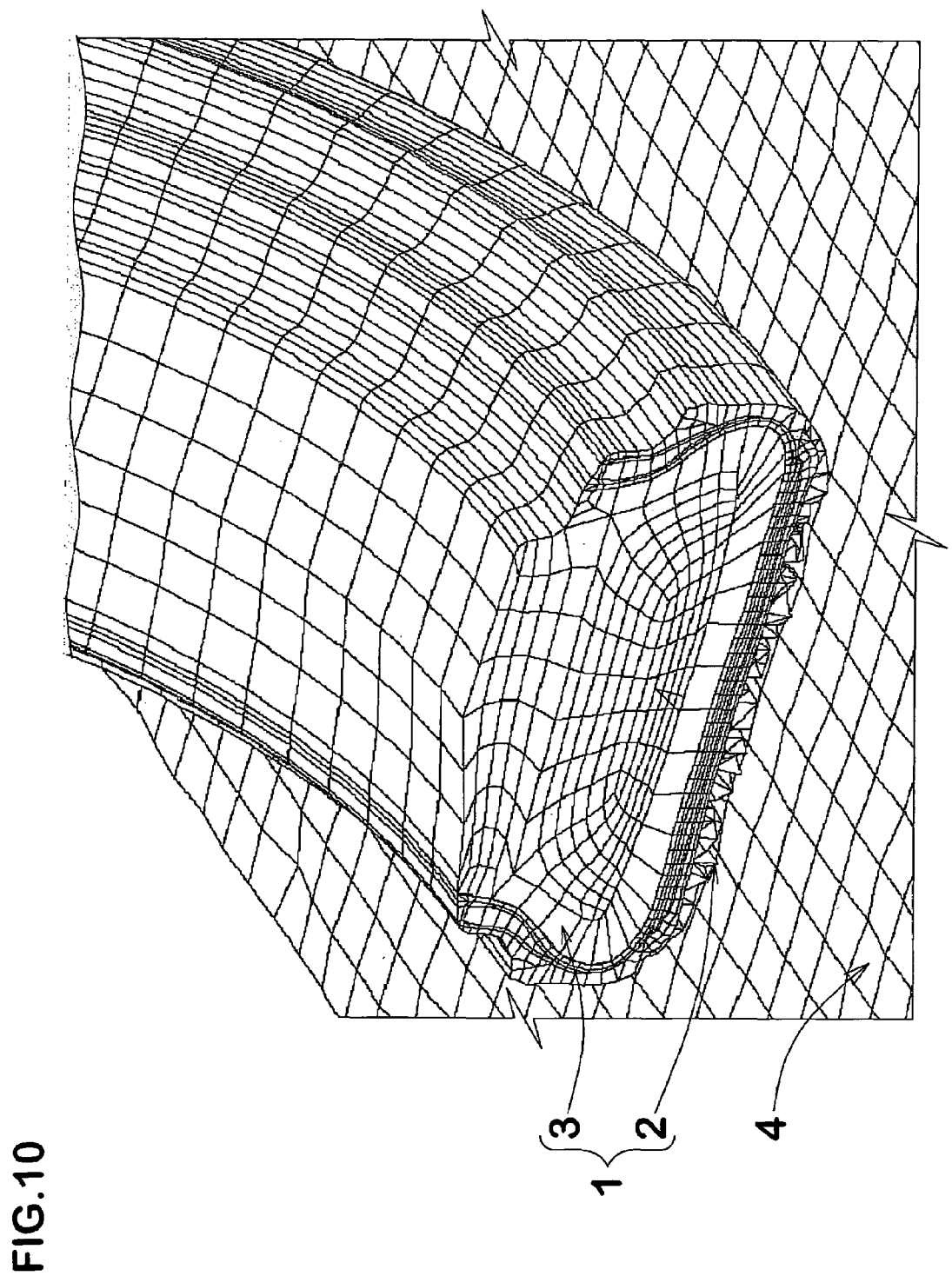
FIG. 10 is a part of an enlarged sectional view of FIG. 9.

Next, as shown in FIGS. 9 and 10, deformation calculations (simulation) of the pneumatic tire model 1 are performed (Step S5). Namely, the state where the pneumatic tire model 1 rolls on the road model 4 is calculated for every small time increment by using the computer device 1. In this embodiment, the pneumatic tire model 1 is made to roll on a stationary road model 4. However, it is possible that a pneumatic tire model 1 with a free rotating tire axis is driven by friction force from a moving road model 4 in contact with the tread of the tire body model 1.

Figure 11:
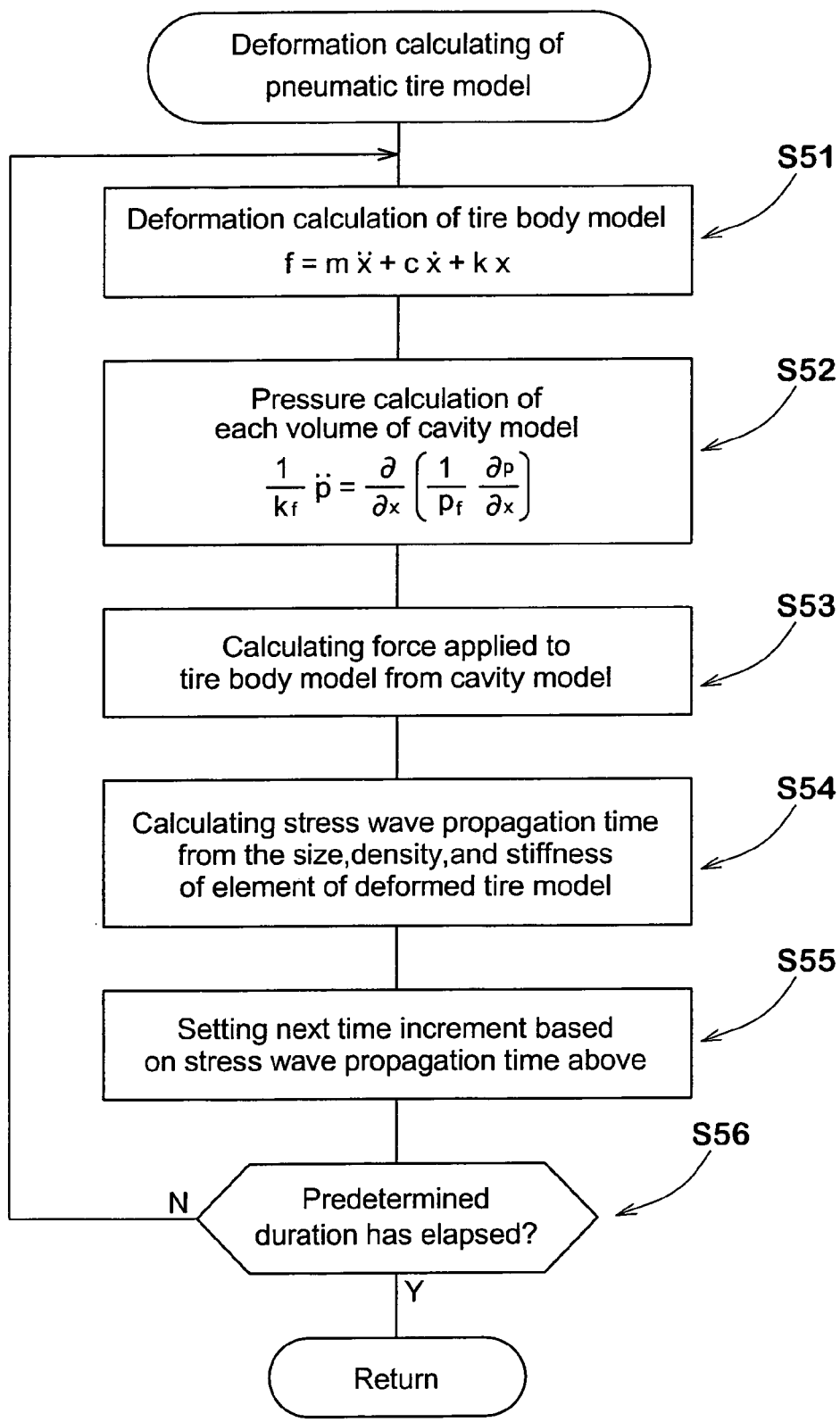
FIG. 11 is a flowchart showing an embodiment of the deformation calculation of the pneumatic tire model.

FIG. 11 shows one embodiment of a flowchart showing the deformation calculation of the pneumatic tire model 1. In step S51, the deformation calculation of the tire body model 3 after the time increment Δt is performed first. The deformation calculations of the tire body model 2 in the present example are performed by finite element method using the equation as follows.

$$f = m\ddot{x} + c\dot{x} + kx \qquad \text{eq. 1}$$

where
f: external force matrix
m: mass matrix
$\ddot{x}$=acceleration matrix
c damping matrix
$\dot{x}$=velocity matrix
k=stiffness matrix
x=displacement matrix Namely, in the deformation calculations, the mass matrix m, the stiffness matrix k and the damping matrix c of the elements are defined based on the material characteristics of each element of the tire body model 2 such as density, modulus, damping coefficient and the like. Next, such matrices are combined to form the matrix of the entire system to be simulated. Then, applying the above-mentioned other conditions, the equation 1 is defined, and is calculated using the computer device 1.

The explicit time integration method is employed in the simulation in this present example. According to the explicit method, the moment that the load acts on each model is taken as time zero, and the time is divided into small increments so as to find the displacement of the model at each point in time. Each initial time increment Δt in the deformation calculation for the tire body model 2 and the cavity model 3 is preferably set from 10 to 100 μs. In order to determine the time increment Δt, for example, the propagating time of the stress wave of each element is calculated first. After that, the time increment Δt is set up by multiplying the minimum of the propagating time by a safety factor such as 0.9 or less.

By deforming the tire body model 2, acceleration is inputted into the cavity model 3 through the boundary between the tire body model 2 and the cavity model 3. Accordingly, in the step S52, pressure of each finite volume of the cavity model 3 is calculated using equation as follows.

$$\frac{1}{k_f}\ddot{p} = \frac{\partial}{\partial x}\left(\frac{1}{\rho_f}\frac{\partial p}{\partial x}\right)$$

Where "$K_f$" is bulk modulus defined into each finite volume of the cavity model 3, "p" is the relative pressure based on the initial pressure of each finite volume of the cavity model 3, "$p_f$" is density each finite volume of the cavity model 3, and "x" is position of each finite volume of the cavity model 3.

Next, force to be applied into the tire body caused by the cavity model 3 is calculated (step S53). The deformation of the tire body model 2 calculated in the step S51 is taken into consideration with the pressure calculation of the cavity model 3 in the step S52. Therefore, in the step S52, pressure change after the time increment Δt of the cavity model 3 can be calculated. Further, the difference between the force calculated before the time increment Δt and the force calculated after the time increment Δt of the cavity model 3 is applied to the next deformation calculation (step S51) of the tire model 2 as an external force when "No" is selected in the step S56.

Next, the stress wave propagation time of each finite element of the tire body model 2 is re-calculated based on its size, density and stiffness (step S54). Then, based on the minimum value of this stress wave propagation time, the time increment for the next deformation calculation is set (step S55). In the present embodiment, the minimum value of the stress wave propagation time or the value which is calculated by multiplying the minimum of the stress wave propagation time by the safety factor (<1.0) is employed.

Next, it is checked whether the predetermined duration of simulation time has been elapsed or not (step S56). When "NO" is selected in the Step S56, the process goes back to the Step S51 to perform one more calculation by adding the newly set time increment. When "Yes" is selected in the step S56, the deformation calculation of the pneumatic tire model 1 is terminated and the process goes to the Step S6.

In the deformation calculation described above, acceleration according to the deformation of the tire body model 2 is inputted from the inner nodes 2$n$1, 2$n$2 . . . of the tire body model 2 to the outer nodes 3$n$1, 3$n$2 . . . of the cavity model 3. On the other hand, force caused by the deformation of finite volumes of the cavity model 3 is inputted into the inner nodes 2$n$1, 2$n$2 . . . of the tire body model 2 from the outer nodes 3$n$1, 3$n$2 . . . of the cavity model 3. Accordingly, it becomes possible for the cavity model 3 to calculate pressure changes in the acceleration on the tire model 2 due to changes in the position or shape of the tire model 2. Therefore, it is possible to analyze the pressure distribution in the cavity model 3 during the tire body model 2 is running. Further, by checking the changing of the pressure distribution in time history, it is also possible to analyze the flow of fluid filled in the cavity I of the tire body model 2. The flow of fluid is one of physical parameters corresponding to the sound and vibration of the cavity i.

For the tire body model 2, it becomes possible to calculate a new deformation due to the reaction force received from the cavity model 3.

Repeating these calculations can analyze the changing contact situation between the tire body model 2 and the cavity model 3, while considering their interaction.

Next, as shown in FIG. 2, data or information on the tire body model 2 and/or cavity model 3 is outputted through the simulation (step 6). The output of the calculation results may contain various physical parameters, and those are sequentially memorized in the computer device 1. Accordingly, it is possible to use the results as numerical data or visualized data such as a chart and a graph.

Usually, required time increment to keep the accuracy of the deformation calculation of the cavity model 3 is large enough compared with the tire body model 2. Therefore, it is not necessarily to calculate pressure change of the cavity model 3 to every time increment calculated from the tire body model 2. For example, in order to reduce time for simulation without deteriorating accuracy of the result, one pressure calculation of the cavity model 3 may be performed every two or more times of the deformation calculations for the tire body model 2 are performed.

Figure 12:
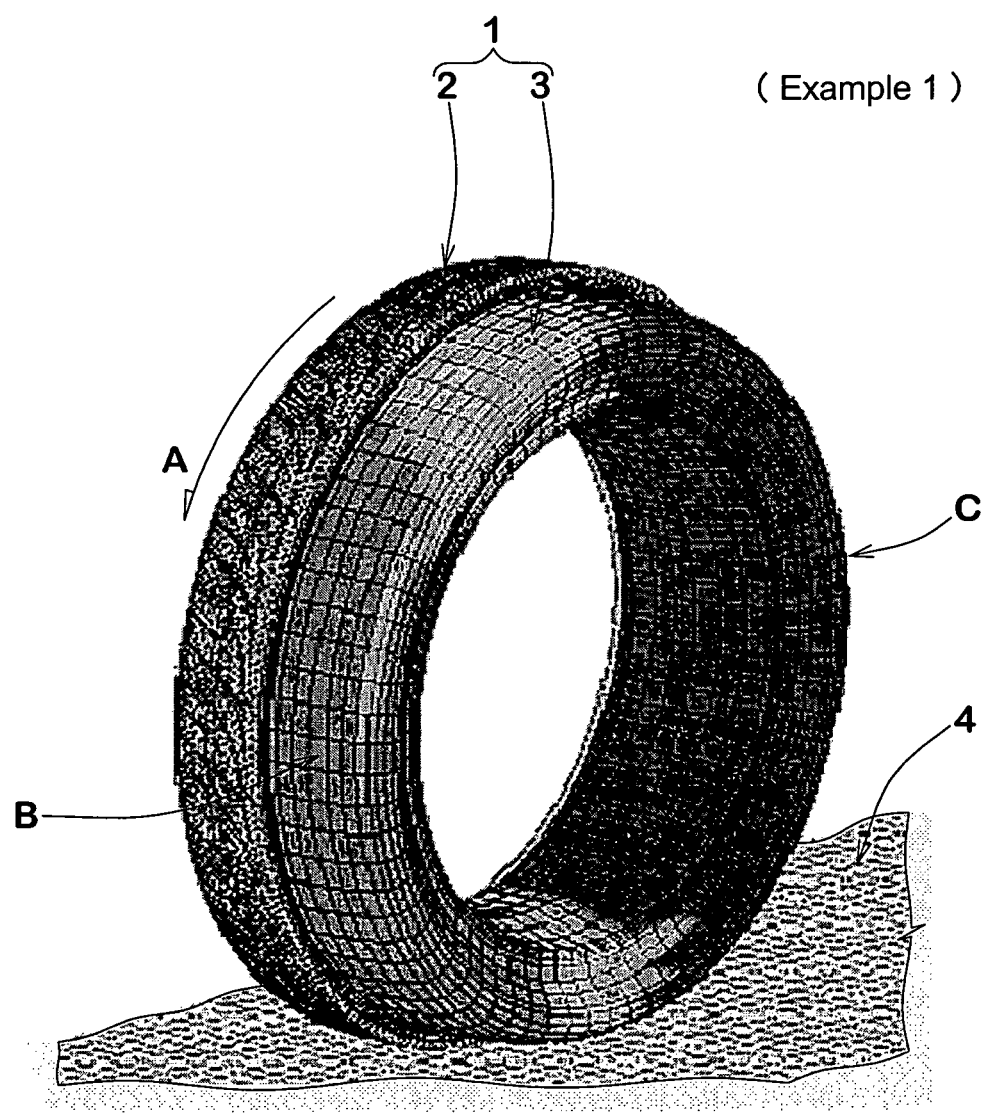
FIG. 12 is a perspective view showing pressure distribution of the cavity model.

FIG. 12 shows a visualized example of the simulation result of pressure distribution at one moment of the pneumatic tire model 1 being rolling with the direction "A" on the road model 4. As shown in FIG. 12, the tire body model 2 is drawn as a section taken along the tire equator to show the cavity model 2 outside. Further, a darker part shown in FIG. 12 has a higher pressure. The result shows that a pair of regions B and C with higher pressure in the cavity model 3 appear on both sides of the tread portion contacting on the road model 4.

Figure 13:
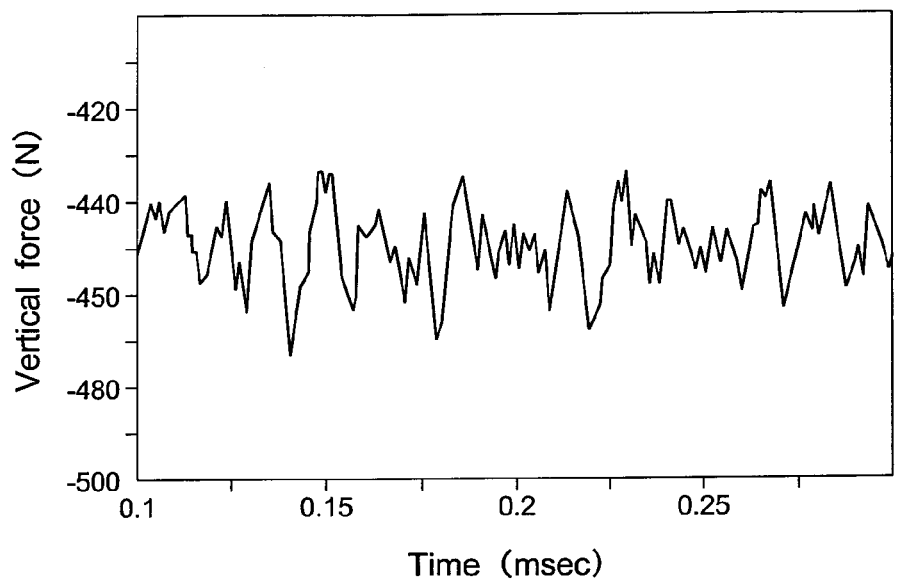
FIG. 13 is a graph showing the relation between vertical force acting on the tire axis of the pneumatic model and time obtained by the simulation.
Figure 14:
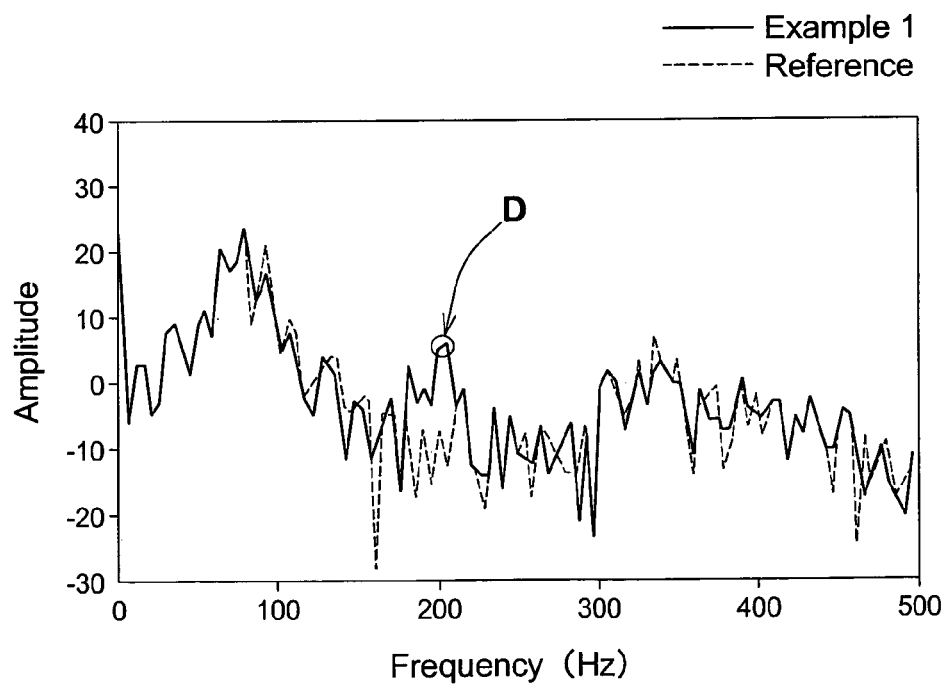
FIG. 14 is a graph showing the result of frequency analysis of FIG. 13.

FIG. 13 shows a visualized example of the simulation result of time history of vertical force acting on the tire axis of the pneumatic tire model 1 during its running. FIG. 14 is a graph showing the result of frequency analysis of FIG. 13. In FIG. 14, a solid line shows the result of example 1 according to the present invention simulation, and a dotted line shows the result of reference simulation which uses only a tire body model without the cavity model. Other conditions are the same between the example 1 and the reference. As shown in FIG. 14, a sharp peak D with a frequency of about 250 Hz is simulated in the example 1. Generally, this peak D is well known as cavity resonance which is generated in a tire cavity. Accordingly, it is confirmed that the pneumatic tire model 1 according to the present invention can simulate even the cavity resonance into the simulation.

In recent years, a pneumatic tire and noise damper assembly is proposed by Japanese patent No. 3,612,059, for example. The assembly comprises a pneumatic tire and a noise damper made of spongy material and being attached to an inner surface of the tire so as to extend in the circumferential direction of the tire. By using the present invention, the effect of the assembly was tested.

Figure 15:
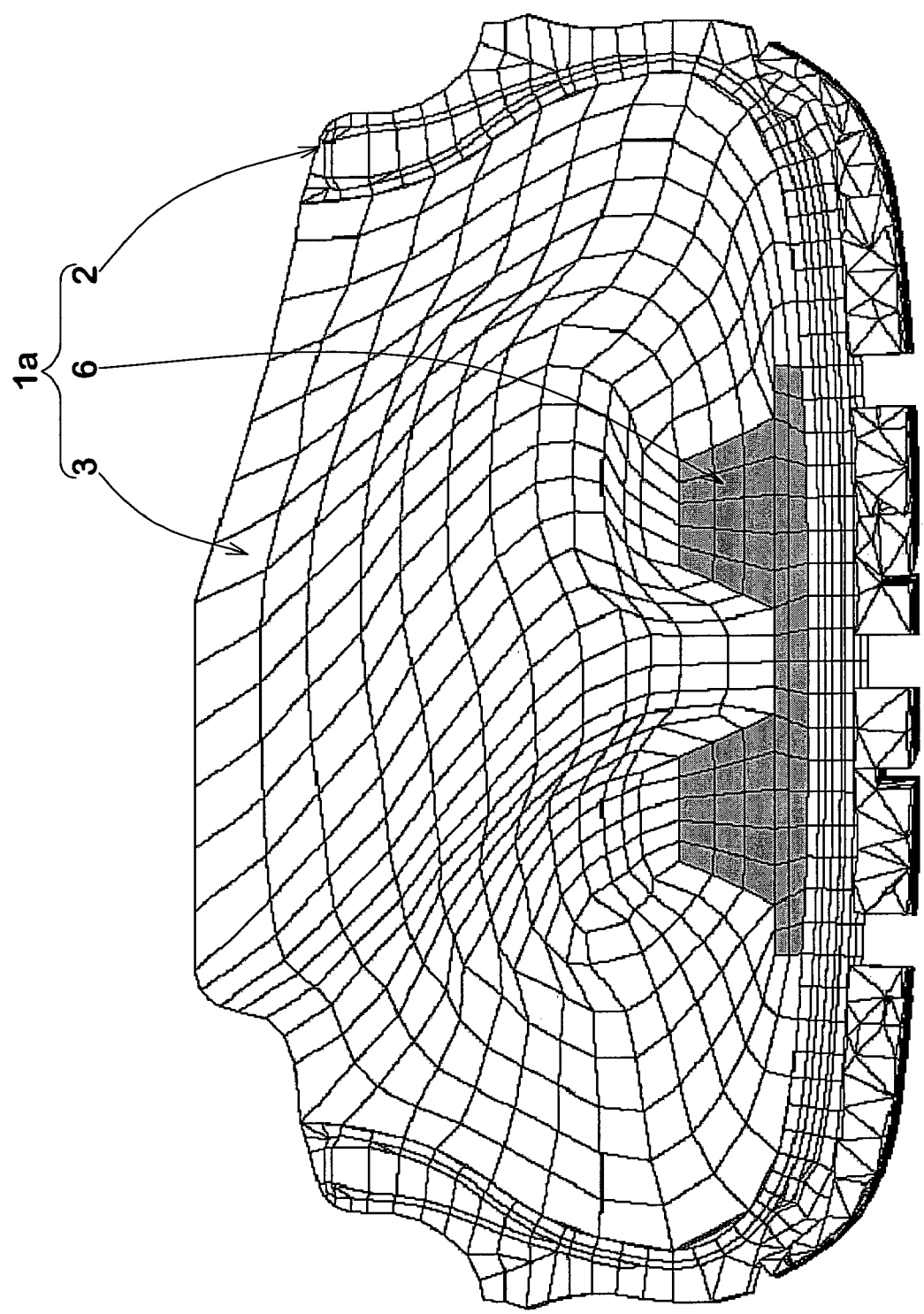
FIG. 15 is a cross sectional view showing another embodiment of the pneumatic tire model with a noise damper.

A pneumatic tire model 1$a$ shown in FIG. 15 was modeled for the assembly above. The pneumatic tire model 1$a$ comprises: the tire body model 2; the cavity model 3; and a noise damper model 6 which is attached to the inner surface of the tire body model 2 and continuously extends in the circumferential direction of the tire. The noise damper model 6 has a cross section having a pair of projecting parts and a groove interposed therebetween. Further, a condition in which the relative distance does not change is defined in the boundary surface between the noise damper model 6 and the cavity model 3.

Figure 16:
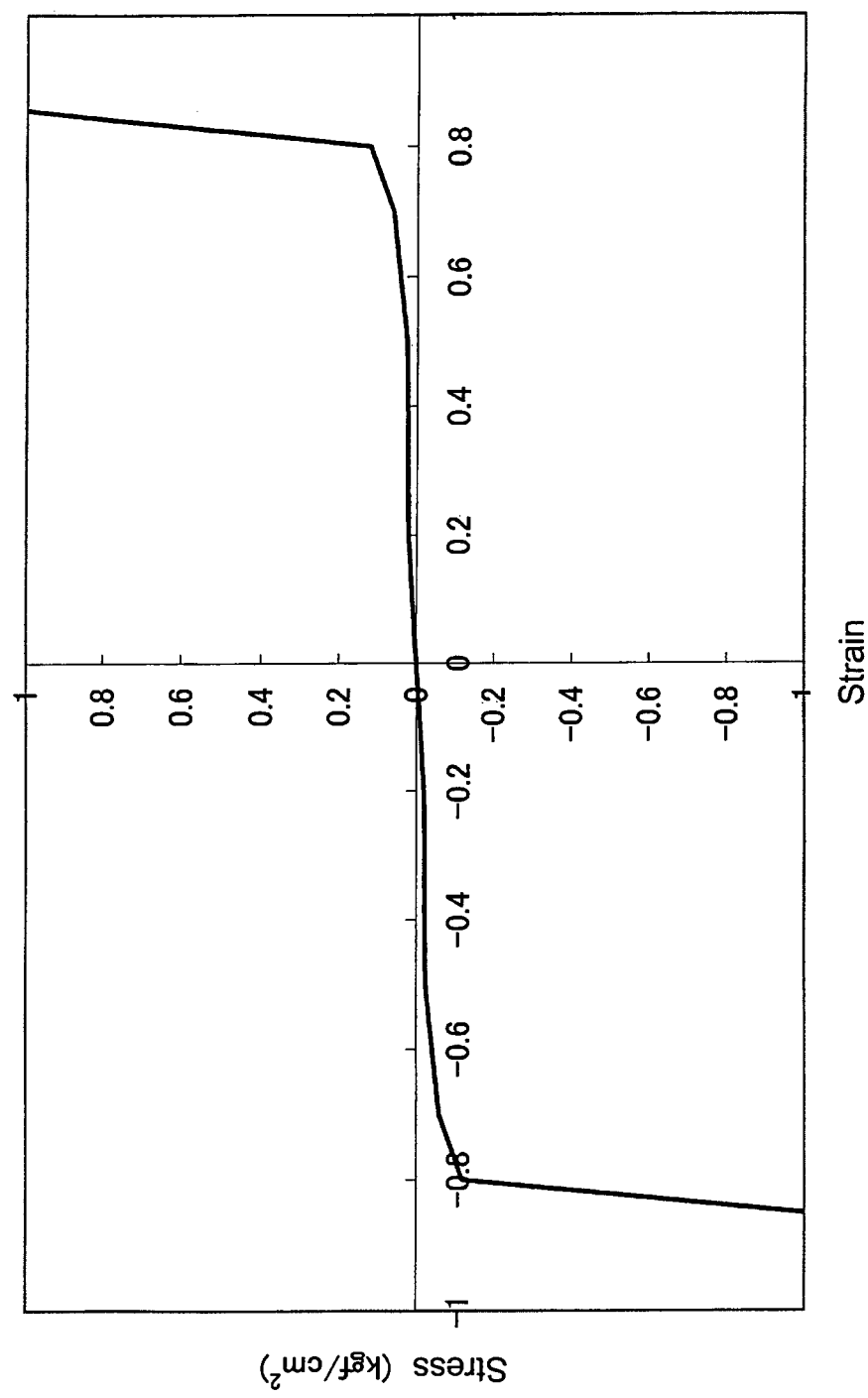
FIG. 16 is a graph showing the stress-strain curve of the noise damper.

A stress-strain property shown in FIG. 16 and density of 25.0 kg/m$^3$ are defined into each finite element of the noise damper model 6.

Figure 17:
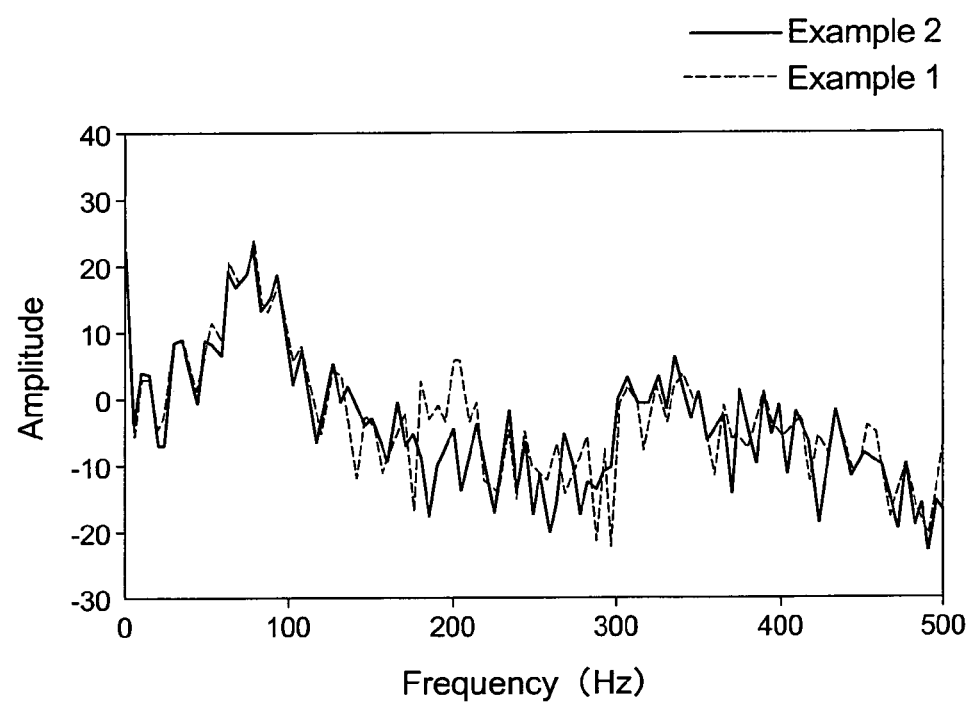
FIG. 17 is a graph showing the result of frequency analysis of the vertical force of the pneumatic tire model of FIG. 15.

FIG. 17 shows the result of frequency analysis of the vertical force of the pneumatic tire model 1$a$ (example 2) from the rolling simulation executed with the same condition of example 1 described above. In FIG. 17, a solid line shows the result of example 2, and a dotted line shows the result of the example 1 without noise damper model 6. As seen in FIG. 17, it is clear from the simulation result of the example 2 that the peak of about 250 Hz corresponding to the cavity resonance is disappeared by the noise damper.

Figure 18:
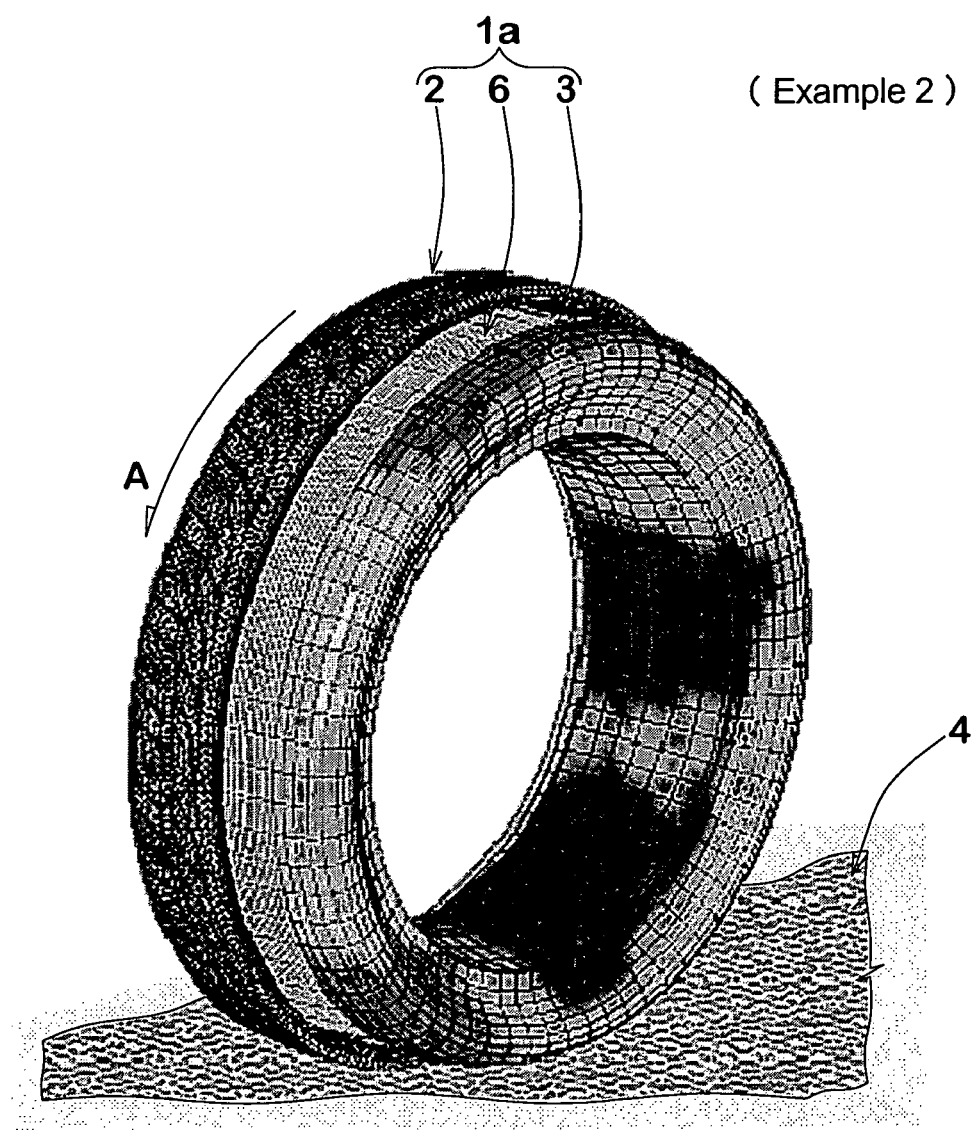
FIG. 18 is a perspective view showing pressure distribution of the cavity model of FIG. 15.

FIG. 18 shows a visualized example of the simulation result of pressure distribution at one moment of the pneumatic tire model 1$a$ being rolling with the direction "A" on the road model 4. As shown in FIG. 18, the tire body model 2 is drawn as a section taken along the tire equator to show the cavity model 2 outside. Further, a darker part shown in FIG. 18 has a higher pressure. The result shows that the area with higher pressure in the cavity model 3 is smaller than the example 1.

The invention claimed is:

1. A method for pneumatic tire simulation comprising the steps of:
   modeling a tire body having a cavity extending in a circumferential direction of the tire using finite elements to build a tire body model;
   modeling the cavity surrounded by the tire body using finite volumes to build a cavity model;
   setting a pneumatic tire model coupling the tire body model with the cavity model so that a relative distance between an outer surface of the cavity model and an inner surface of the tire body model does not change;

modeling a road using finite elements to build a road model; and executing a numerical simulation in which the tire model is made to roll on the road model in a predetermined condition.

2. The method for pneumatic tire simulation according to claim 1, wherein density and bulk modulus are defined into each finite volume of the cavity model, and the step of executing comprises a step of calculating pressure of each volume of the cavity model.

3. The method for pneumatic tire simulation according to claim 1, wherein finite volumes of the cavity model comprise:

a plurality of covering volumes each being coupled to the inner surface of the tire body model and a plurality of mid volumes being surrounded by the covering volumes, and at least one covering volume has a greater volume than that of the mid volume being coupled inside thereof.

4. The method for pneumatic tire simulation according to claim 3, wherein the tire body model comprises a pair of sidewall portions and a tread portion interposed therebetween, the covering volume being coupled with the inner surface of the tread portion and/or the inner surface of the sidewall portions has a greater volume than that of the mid volume being coupled inside thereof.

5. The method for pneumatic tire simulation according to claim 4, wherein the covering volume being coupled with the inner surface of the tread portion has a radial length greater than that of the mid volume being coupled inside thereof.

6. The method for pneumatic tire simulation according to claim 1, wherein each covering volume is defined using the Lagrange element which can move and deform together with the tire body model, and all elements of the cavity model 3 except the covering volumes are defined using the Euler elements which can only rotate, but can not deform.

7. A method for pneumatic tire simulation comprising the steps of:

modeling a tire body having a cavity extending in a circumferential direction of the tire using finite elements to build a tire body model;

modeling the cavity surrounded by the tire body using finite volumes to build a cavity model;

setting a pneumatic tire model coupling the tire body model with the cavity model so that a relative distance between an outer surface of the cavity model and an inner surface of the tire body model does not change;

modeling a road using finite elements to build a road model; and executing a numerical simulation in which the tire model is made to roll on the road model in a predetermined condition, wherein the finite volumes of the cavity model comprise a plurality of covering volumes each being coupled to the inner surface of the tire body model and a plurality of mid volumes being surrounded by the covering volumes, the tire body model comprises a pair of sidewall portions and a tread portion interposed there between, each covering volume being coupled with the inner surface of the tread portion and/or the inner surface of the sidewall portions has a greater volume than that of the mid volume being coupled inside thereof, and each covering volume being coupled with the inner surface of the tread portion has a radial length greater than that of the mid volume being coupled inside thereof.

8. The method for pneumatic tire simulation according to claim 7, wherein density and bulk modulus are defined into each finite volume of the cavity model, and the step of executing comprises a step of calculating pressure of each volume of the cavity model.

9. The method for pneumatic tire simulation according to claim 8, wherein each covering volume is defined using the Lagrange element which can move and deform together with the tire body model, and all elements of the cavity model except the covering volumes are defined using the Euler elements which can only rotate, but can not deform.

* * * * *